United States Patent Office 3,565,931
Patented Feb. 23, 1971

3,565,931
PROCESS FOR PREPARING ORGANOTIN MERCAPTO CARBOXYLIC ACID ESTER SULFIDES CONTAINING MORE THAN 18% TIN
Lawrence Robert Brecker, 1355 E. 18th St., Brooklyn, N.Y. 11230
No Drawing. Filed Dec. 19, 1967, Ser. No. 691,867
Int. Cl. C07f 7/22; C08f 45/62
U.S. Cl. 260—429.7                                    21 Claims

ABSTRACT OF THE DISCLOSURE

A process is provided for preparing organotin mercapto carboxylic acid ester sulfides having a high concentration of tin, in the range from about 18 to about 35% by weight, and a high concentration of sulfur, within the range from about 10 to about 25% sulfur, by reaction of an organotin halide with a mercapto acid ester and an alkali or alkaline earth metal base, and then reacting the product with an alkali or alkaline earth metal sulfide.

The compounds are useful polyvinyl chloride resin stabilizers.

Organotin mercapto acid ester halides also are provided, that are intermediates in the process for preparing the organotin mercapto carboxylic acid ester sulfides.

---

This invention relates to a process for preparing organotin mercapto carboxylic acid ester sulfides having a high concentration of tin and to organotin mercapto acid ester halides that are useful intermediates in such process.

The stabilizing effectiveness of organotin stabilizers for polyvinyl chloride resins is generally associated with organotin groups, tin content, and, to some degree, sulfur content. The higher the relative proportion of these, the more effective the organotin compound usually is as a stabilizer. However, there are exceptions to the rule that make prediction fallible.

The organotin sulfides, for example, offer the highest tin and sulfur contents per organotin group, and yet they are not the best stabilizers, and have never found a place as a commercial stabilizer, affording, among other things, a poor initial color. Despite their considerably lower tin and sulfur contents, the most effective organotin stabilizers presently in use, and the recognized standard for judging other organotin stabilizers, are the organotin mercapto carboxylic acid esters. The great majority of these materials, and certainly all of the most commonly used commercial products, are either liquid at room temperatures or are low-melting solids. The addition of even a small proportion of a liquid stabilizing additive has unfavorable effects on the heat distortion temperature and the impact strength of polyvinyl chloride resins. As a result, it is difficult to provide a high degree of chemical stability and a high degree of structural stability, and at the same time crystal clarity, problems which generally go hand in hand when rigid resins are subjected to high temperature conditions. To attain all of these goals, it is necessary to use as small an amount of the stabilizer as possible, so that the structural strength of the resin is least affected. This objective is of course facilitated if the stabilizer has a very high tin content, but the organotin mercapto carboxylic acid esters are not so satisfactory, from this standpoint.

The use of the organotin mercapto carboxylic acid esters as stabilizers for polyvinyl chloride resins is well known, and is generally set forth in such early patents as U.S. Pats. Nos. 2,752,325 to Leistner et al., issued June 26, 1956; 2,641,596 to Leistner et al., issued June 9, 1953; and 2,648,650 to Weinberg et al., issued Aug. 11, 1953.

The organotin sulfides are described in U.S. Pat. No. 2,746,946 to Weinberg et al., dated May 22, 1956. Polymeric organotin sulfides having a high proportion of tin and sulfur by weight have also been suggested. Examples of such materials are given in U.S. Pat. No. 3,021,302 to Frey, dated Feb. 13, 1962, which discloses polymeric condensation products of hydrocarbon stannonic acid, hydrocarbon thiostannonic acid, and co-condensation products of these materials. However, all of these materials have suffered from one or another failing, which until now has prevented their coming into general commercial use.

Dutch patent specification No. 6,700,014, published July 4, 1967, and referring to U.S. applications Ser. Nos. 517,967, filed Jan. 3, 1966, and 531,805, filed Mar. 2, 1966, describes combinations of monoalkyltin sulfides with trisubstituted hindered phenols, and optionally, in addition, with organotin mercapto carboxylic acids, mercapto carboxylic acid esters, or mercaptides. The purpose of the addition of the phenol is evidently to avoid the deleterious properties of the organotin sulfide, and the further addition of the organotin mercaptide, mercapto acid or mercapto acid ester supplements the effect of the phenol and of the organotin sulfide in this regard.

Similar disclosures of polymeric organotin compounds, which generally include a chain of tin atoms connected through oxygen or sulfur atoms, are set out in U.S. Pats. Nos. 2,597,920, dated Apr. 15, 1962; 2,626,953, dated Jan. 27, 1953; 2,628,211, dated Feb. 10, 1953; 2,746,946, dated May 22, 1956; 3,184,430, dated May 18, 1965; and 2,938,013, dated May 24, 1960.

U.S. Pat. No. 2,809,956, dated Oct. 15, 1957, discloses polymeric organotin compounds which include mercapto ester groups attached to tin, having the general formula:

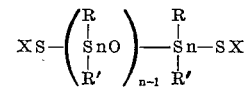

wherein SX can be a mercapto; mercapto alcohol or ester; or mercapto acid ester group. These compounds, however, have been found not to be as effective stabilizers as the monomeric organotin mercapto acid esters, such as dibutyltin bis(isooctyl thioglycolate).

U.S. Pats. Nos. 3,078,390, 3,196,129 and 3,217,004 describe a series of thioacetal and thioketal organotin carboxylate salt stabilizers which can be prepared in situ by the reaction of thioacetal and thioketal carboxylic acids with dihydrocarbontin oxides or sulfides or the corresponding monohydrocarbon- or trihydrocarbontin compounds.

According to the present invention, a process is provided for preparing organotin α- or β-mercapto carboxylic acid ester sulfides having a relatively high concentration of tin, within the range from about 18 to about 35% Sn, and a relatively high concentration of sulfur, within the range from about 10 to about 25% S, which are effective polyvinyl chloride resin stabilizers.

The term "sulfide" in this composition refers to the sulfide sulfur group, =S, wherein the sulfide sulfur valences are linked to the same tin atom or to different tin atoms. Each organotin compound contains per tin atom one or two hydrocarbon or heterocyclic groups linked to tin through carbon, one sulfide sulfur, and at least one α- or β-mercapto carboxylic acid ester group. For best results, and to obtain a synergistic stabilizing effectiveness, a mixture is prepared composed of at least one compound which contains only one hydrocarbon group per tin atom (referred to herein as a "monoorganotin" compound) and at least one compound which contains two hydrocarbon groups per tin atom (referred to herein as a "diorganotin" compound), each hydrocarbon group being linked to tin through a carbon atom. This combination generally improves the initial color of a resin composition during heating, i.e., during the first thirty minutes of a heat test, and can also improve the long-term stability before final charring.

The process proceeds starting from the corresponding organotin halide, which in turn can be prepared from the organotin oxide or stannonic acid. The organotin halide is reacted with an α or β mercaptocarboxylic acid ester, to form an intermediate organotin mercaptocarboxylic acid ester halide, and this is reacted with an alkali metal or alkaline earth metal sulfide to produce the organotin mercapto acid ester sulfide.

The organotin mercapto acid ester halides are new compounds useful not only as intermediates in this process but also as stabilizers for polyvinyl chloride resins in the same manner as the organotin mercapto acid ester sulfides. They are defined by the formula:

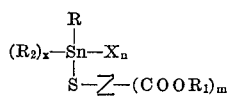

$n$ is an integer from one to two.

$m$ is the number of $COOR_1$ groups, and is an integer from one to four, $x$ is an integer from zero to one.

$R$, $R_1$, $R_2$, and $Z$ are as defined below.

$X$ is halogen.

The organotin mercapto acid ester sulfides obtained by the process of the invention from these intermediates can be defined as organotin compounds having organic radicals linked to tin only through carbon, mercapto sulfur, and sulfide sulfur groups, and have the general formula:

(1) 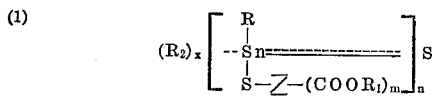

$n$ is an integer from one to two.

$m$ is the number of $COOR_1$ groups, and is an integer from one to four.

$x$ is an integer from zero to one.

$R$ is a hydrocarbon radical having from about one to about eighteen carbon atoms, and preferably from four to eight carbon atoms.

$R_1$ is an organic group derived from a monohydric or polyhydric alcohol of the formula $R(OH)_{n4}$, where $n_4$ is an integer from one to about four, but is preferably one or two.

$R_2$ is $R$ or $SZ(COOR_1)_m$.

$Z$ is a bivalent alkylene radical carrying the S group in a position alpha or beta to a $COOR_1$ group, and can contain additional free carboxylic acid, carboxylic ester, or carboxylic acid salt groups, and mercapto groups. The $Z$ radical has from one to about five carbon atoms.

The S—$Z$—$(COOR_1)_m$ groups are derived from mono- or poly α- and β-mercapto carboxylic acid esters by removal of the hydrogen atom of the mercapto group. These include the esters of aliphatic acids which contain at least one mercapto group, such as, for example, esters of mercaptoacetic acid, α- and β-mercaptopropionic acid, α- and β-mercaptobutyric acid and α- and β-mercaptovaleric acid, α- and β-mercaptohexanoic acid, thiomalic acid, α- and β-mercaptoadipic acid and α- and β-mercaptopimelic acid.

The R hydrocarbon groups can be selected from among alkyl, aryl, cycloalkyl, alkyl cycloalkyl, cycloalkyl, and arylalkyl groups having from one to eighteen carbon atoms, and can be the same or different.

The R groups linked to tin through carbon can, for example, be methyl, ethyl, propyl, isopropyl, n-butyl, iso-butyl, tert-butyl, sec-butyl, amyl, hexyl, octyl, 2-ethylhexyl, isooctyl, dodecyl, palymityl, myristyl, stearyl, phenyl, benzyl, cumyl, tolyl, xylyl, cyclohexyl, cyclooctyl, cycloheptyl, and cyclopentyl.

$R_1$ can be alkyl, alkylene, alkenyl, aryl, arylene, mixed alkyl-aryl, mixed aryl-alkyl, cycloaliphatic and heterocyclic, and can contain from about one to about twelve carbon atoms, and can also contain ester groups, alkoxy groups, hydroxyl groups, halogen atoms and other inert substituents. Preferably, $R_1$ is derived from a monohydric alcohol containing from one to about fifteen carbon atoms, such as methyl, ethyl, propyl, s-butyl, n-butyl, t-butyl, isobutyl, octyl, isooctyl, 2-ethylhexyl, 2-octyl, decyl, lauryl, cyclic monohydric alcohols, such as cyclopropanol, 2, 2-dimethyl-1-cyclopropanol, cyclobutanol, 2-phenyl-1-cyclobutanol, cyclopentanol, cyclopentenol, cyclohexanol, cyclohexenol, 2-methyl-, 3-methyl-, and 4-methyl-cyclohexanol, 2-phenyl-cyclohexanol, 3,3,5-trimethyl cyclohexanol, cycloheptanol, 2-methyl-, 3-methyl- and 4-methyl cycloheptanol, cyclooctanol, cyclononanol, cyclodecanol, cyclododecanol, or from a dihydric alcohol such as glycols containing from two to about fifteen carbon atoms, including ethylene glycol, propylene glycol, diethylene glycol, dipropylene glycol, tetramethylene glycol, neopentyl glycol and decamethylene glycol, 2,2,4-trimethyl pentane-diol, 2,2,4,4-tetramethyl cyclobutane-diol, cyclohexane-1,4-dimethanol, and polyols such as glycerine, trimethylol ethane, mannitol, sorbitol, erythritol, dipentaerythritol, pentaerythritol, and trimethylol propane.

The alcohol $R_1(OH)_{n4}$ need not be a single compound. Many of the commercially available and inexpensive alcohol mixtures are suitable and advantageous. The branched-chain primary alcohols made by the Oxo process and known as isooctyl, isodecyl and isotridecyl alcohols are mixtures of isomers, but can be used as if they were single compounds. Other alcohol mixtures that can be used include mixed homologous primary alcohols arising from oxidation of the reaction product of ethylene with triethyl aluminum, isomers and homologous secondary alcohols from the hydration of linear $C_5$ to $C_{15}$ olefins or the oxidation of linear $C_6$ to $C_{15}$ paraffins, isomers and homologous straight-chain and methyl-branched primary alcohols resulting from the application of the Oxo process to $C_6$ to $C_{14}$ linear alpha-olefins, homologous mixtures of reaction products from ethylene oxide with alcohols, phenols, or carboxylic acids of the proper carbon content and the like.

It will be evident from the above that the organotin mercapto carboxylic acid ester sulfides of the invention can fall into one of the following general categories:

A.

B.

C.

D.

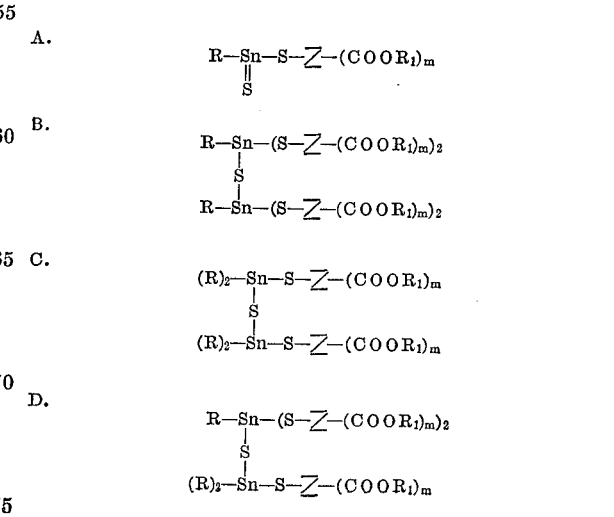

The organotin mercapto carboxylic acid ester sulfides useful in this invention can exist as polymers, having the general formula:

2) 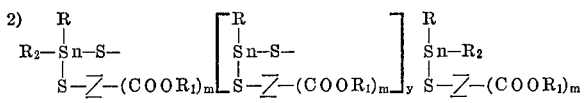

R and S—Z—(COOR$_1$)$_m$ are as defined earlier.

R$_2$ is R or S—Z—(COOR$_1$)$_m$ and $y$ is a number from one to a practical limit of five.

Such polymers could be based on (a) monoalkyl tin groups only, having the general formula:

E. 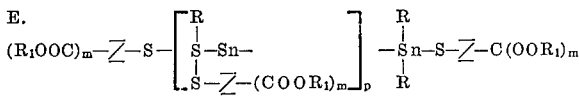

or (b) mixtures of mono- and dialkyl tin groups, having the formula:

F. 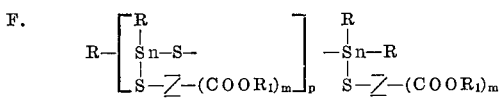

where $p$ is a member from two to a practical limit of five.

Mixtures of A and/or B and/or E with C and also D or F alone, are superior in stabilizing effectiveness to any of A, B, C and E, taken separately, and are therefore preferred.

The organotin mercapto acid ester sulfides of the invention can be prepared by reacting diorganotin halides, monoorganotin halides or mixtures thereof, at a temperature within the range from about 25° to about 200° C. with less than stoichiometric amounts of mercapto carboxylic acid ester, in the presence of water or inert organic solvents and an alkali or alkaline metal base such as oxide or hydroxide or tertiary amine base in an amount stoichiometrically equivalent to the mercapto acid ester, and the resulting organotin mercapto acid ester halide intermediate can be further reacted with alkali or alkaline earth metal sulfides, such as sodium sulfide, to produce the organotin mercapto acid ester sulfide. The following scheme shows the reactions that are involved, in the case of monoorganotin compounds (I) and diorganotin compounds (II).

I. 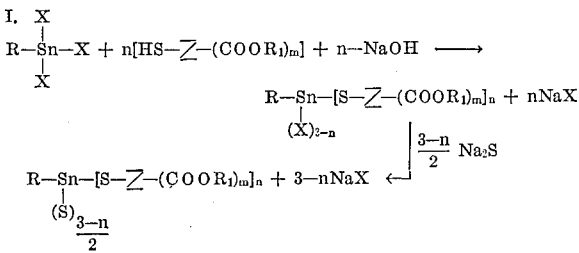

When $n$ is one the molecular structure corresponds to Formula A; when $n$ is two the molecular structure corresponds to Formula B.

II. 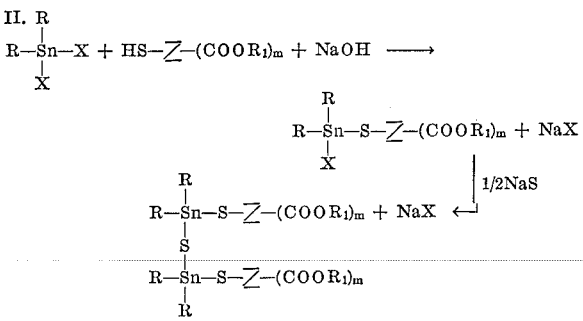

In the above schemes, X is halide, and $n$ now is one or two. Scheme I illustrates the preparation of the monoorganotin mercapto acid ester sulfides, and Scheme II the reaction for the preparation of diorganotin mercapto acid ester sulfides.

Alternatively, the monoalkyl tin oxides, stannonic acids, and/or dialkyl tin oxides can be used to prepare the organotin compounds of the invention. The alkyl tin oxide is reacted with an approximately stoichiometric amount up to a 25% excess of dilute mineral acid, such as, for example, hydrochloric acid, at elevated temperatures of from about 25 to about 200° C., to form an aqueous solution (in the case of monoalkyl tin compounds) or a suspension (in the case of dialkyl tin compounds) of the organotin salt, for example, the chloride in water. The procedure is continued as previously outlined, except that when an excess of acid is used, it should be neutralized by addition of alkali before the alkali or alkaline earth metal sulfide is added.

In the steps of reacting the organotin halide with the organotin mercapto acid ester, and of reacting the organotin mercapto acid ester halide with alkali metal or alkaline earth metal sulfide, it is important to take care that the pH of the reaction mixture does not exceed about 10, i.e., become strongly basic, by too rapid addition of alkali hydroxide or sulfide, or addition of excess alkali hydroxide or sulfide, since this may result in hydrolysis of the mercapto acid ester.

Where the monoorganotin mercapto acid ester sulfide is being prepared, it will be understood that the product can have the formula shown under A or B, above, or both can exist in admixture, according to the relative proportion of mercapto acid ester and of sulfide reacted with the organotin halide. Compound B has one-half the equivalents of sulfide sulfur of compound A.

Similarly, mixed mono and diorganotin compounds of the type of compound D are obtained by using mixed mono- and diorganotin oxides or halides as starting materials. When other than stoichiometric proportion of organotin halide or oxide, mercaptocarboxylic acid ester and/or alkali sulfide are reacted, polymers are obtained. For example, as the ratio of mercapto carboxylic acid ester to alkali sulfide is increased from $n=1$ to $n=2$ in Scheme I, compounds of the type of E are obtained. Other variations within the generic formula of the invention will be evident to those skilled in the art from the above description.

The process of this invention, as is evident from the above Schemes I and II, proceeds in two steps, starting from the organotin halides, or in three steps, starting from the organotin oxides or stannonic acids. It is not necessary, however to separate or isolate the reaction product after each step. After the conversion of the organotin halide to the organotin mercapto acid ester halide, the alkali metal or alkaline earth metal sulfide can be added, while maintaining the pH below 10, and conversion to the sulfide then effected.

The reaction in each step proceeds in the presence of water, which serves as a solvent or vehicle for the alkali metal or alkaline earth metal hydroxide or sulfide, and the inorganic halide formed as a by-product, as well as the organotin compound reactants and reaction products. The amount of water is not critical, but since the organotin mercapto acid ester sulfide must be separated therefrom at the conclusion of the reaction, there is no advantage in using more than is necessary to provide a fluid suspension or solution.

The reactants can be blended in any sequence. Provided alkalinity is controlled at a pH below 10, when the free mercapto acid ester or a mercapto acid ester group is present, the alkali can be added in aqueous solution to an aqueous suspension or solution of the starting organotin compound, while checking pH to be sure the addition is not too rapid, and does not greatly exceed the rate of reaction of the hydroxide or sulfide.

Any alkali or alkaline earth metal hydroxide or sulfide can be used, such as sodium hydroxide, potassium hydroxide, ammonium hydroxide, calcium hydroxide, barium hydroxide, or strontium hydroxide; sodium sulfide, lithium sulfide, potassium sulfide, calcium sulfide, barium sulfide, or strontium sulfide. Strong amine bases can also be used as an acid acceptor, such as pyridine, triethylamine, tributylamine, triethanolamine, monoethanolamine, or diethanolamine.

The mineral acid used to convert an organotin oxide or stannonic acid to an intermediate with which a mercapto acid ester will react is preferably a halogen acid, such as hydrogen chloride, hydrogen bromide, or hydrogen iodide.

The reaction proceeds at room temperature, and is usually complete within less than one hour. However, reaction can be accelerated by use of an elevated temperature. The organotin mercapto acid ester sulfides of the invention are quite stable, and temperatures as high as 200° C. can usually be employed, but the reaction temperature does not of course exceed a temperature at which the reaction product decomposes. A preferred range is from 35 to 150° C.

The organotin mercapto acid ester sulfides are soluble in paraffin hydrocarbons, and can be extracted therewith from the reaction mixture at the conclusion of the process. If they are insoluble in the reaction mixture, they can also be separated by filtration or centrifuging. Fractional crystallization is satisfactory if they are insoluble in the reaction mixture.

It has been indicated previously that synergistic stabilizing effectiveness is obtained by the use of mixtures of monoorganotin and diorganotin mercapto acid ester sulfides in accordance with the invention. The proportions of each can be varied within the range of from 10 to 90% monoorganotin ester sulfide and from 90 to 10% of the diorganotin ester sulfide, preferably between 20 to 80% and 80 to 20%. Compounds of type D or polymers of type F have a considerably enhanced stabilizing effectiveness as compared to any of compounds A, B or C, or the polymer E. Accordingly, mixtures of any of compounds A and/or B and/or E with C, or compounds D or F above, are preferred in accordance with the invention.

The following organotin mercapto carboxylic acid ester sulfides are typical of those coming within the invention:

1.  
$$C_8H_{17}\text{-}Sn(=S)\text{-}S\text{-}CH(COOC_2H_5)\text{-}CH_2\text{-}COOC_2H_5$$

2.  
$$iso\text{-}C_4H_9\text{-}Sn(=S)\text{-}S\text{-}CO_2COOC_{11}H_{23}$$

3.  
$$(n\text{-}C_6H_{13})_2\text{-}Sn\text{-}S\text{-}CH_2\text{-}COOC_4H_9$$
$$|S|$$
$$(n\text{-}C_6H_{13})_2\text{-}Sn\text{-}S\text{-}CH_2\text{-}COOC_4H_9$$

4.  
$$(n\text{-}C_3H_7)_2\text{-}Sn\text{-}S\text{-}CH_2CH_2COOCH_2CH_2\text{-}O\text{-}CH_2CH_2OH$$
$$|S|$$
$$(n\text{-}C_3H_7)_2\text{-}Sn\text{-}S\text{-}CH_2CH_2COOCH_2CH_2\text{-}O\text{-}CH_2CH_2OH$$

5.  
$$n\text{-}C_5H_{11}\text{-}Sn(C_4H_9)\text{-}S\text{-}CH_2COOC_4H_9\text{-}iso$$
$$|S|$$
$$n\text{-}C_5H_{11}\text{-}Sn(C_4H_9)\text{-}S\text{-}CH_2COOC_4H_9\text{-}iso$$

6.  
$$C_4H_9\text{-}Sn(=S)\text{-}S\text{-}CH_2COOC_8H_{17}\text{-}iso$$

7.  
$$iso\text{-}C_4H_9\text{-}Sn\text{-}[S\text{-}CH(CH_3)\text{-}COOCH_2CH_2OCH_3]_2$$
$$|S|$$
$$iso\text{-}C_4H_9\text{-}Sn\text{-}[S\text{-}CH(CH_3)\text{-}COOCH_2CH_2OCH_3]_2$$

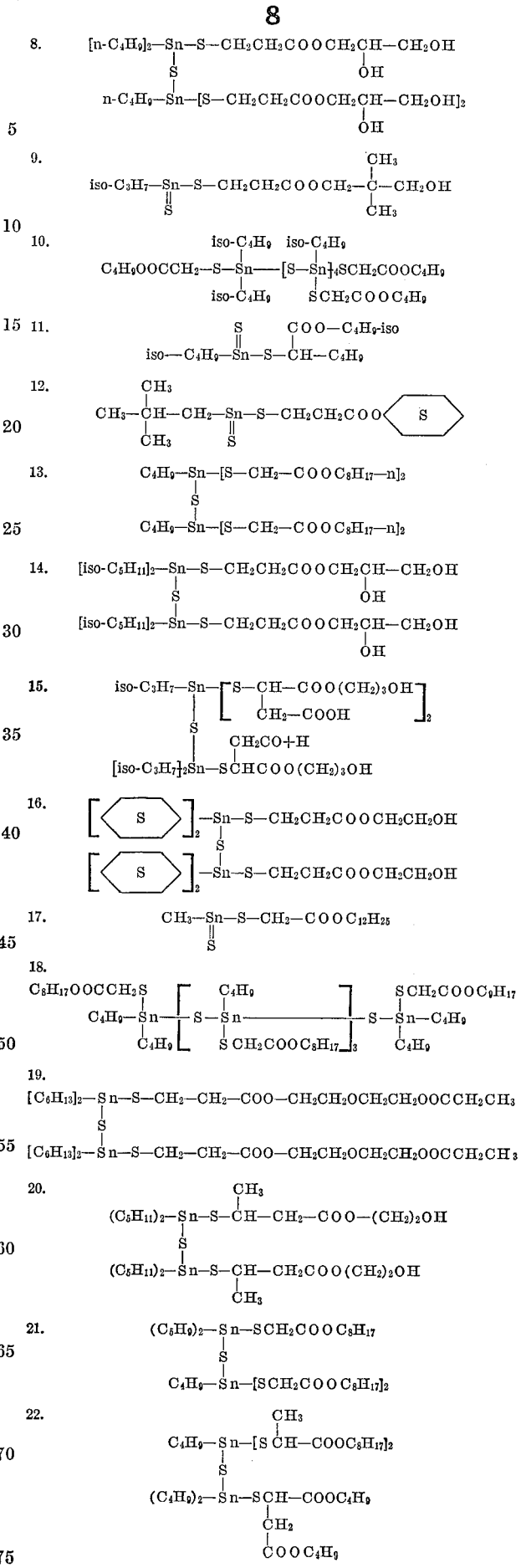

23. n—C₅H₁₁—Sn—S—CH₂COOC₄H₉
         ‖
         S

24. 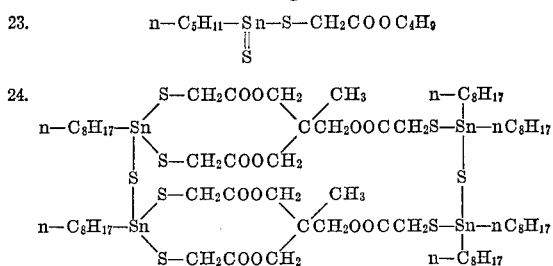

Specific combinations of organotin mercapto carboxylic acid ester sulfides that can be used according to this invention include the following:

(1) Mono-n-butyltin monoisooctyl thioglycolate sulfide
   +Bis-(di-n-butyltin monoisooctyl thioglycolate) sulfide.
(2) Mono-n-octyltin monocyclohexyl thioglycolate sulfide
   +Bis-(di-n-octyltin monocyclohexyl thioglycolate) sulfide.
(3) Bis-(n-butyltin di-n-butyl thiomalate) sulfide
   +Bis-(di-n-butyltin mono(isooctyl thioglycolate) sulfide.
(4) Bis-(n-octyltin di-2-ethylhexyl betamercaptopropionate) sulfide
   +Bis-(di-n-octyltin monoisooctyl thioglycolate) sulfide.
(5) Bis-(n-octyltin diisooctyl thioglycolate) sulfide
   +Bis-(di-n-octyltin monoisooctyl thioglycolate) sulfide.
(6) n-Octyltin monoisooctyl thioglycolate sulfide
   +Bis-(di-n-butyltin monoisooctyl thioglycolate) sulfide.
(7) Cyclohexyltin monoisooctyl thioglycolate sulfide
   +Bis-(dicyclohexyltin monoisooctyl thioglycolate) sulfide.
(8) Bis-(mono-n-propyltin dicyclohexyl thioglycolate) sulfide
   +Bis-(di-2-ethylhexyltin mono-2-ethylbutyl thioglycolate) sulfide.
(9) Bis-(di-n-butyltin mono-2-ethoxyethyl alphamercaptopropionate) sulfide
   +Bis-(isobutyltin di-tetrahydrofurfuryl betamercaptopropionate) sulfide.
(10) t-Butyltin mono(methyl thioglycolate) sulfide
   +Bis-(diphenyltin monophenoxyethyl thioglycolate) sulfide.
(11) Ethyltin monoisooctyl thioglycolate sulfide
   +Bis-(dibenzyltin mono-2-ethylhexanoloxethyl thioglycolate) sulfide.
(12) Bis-(isopropyltin di-2,2-dimethylpentyl thioglycolate) sulfide
   +Bis-(diisoamyltin mono-2-octyl alphamercaptopropionate) sulfide.
(13) Bis-(n-butyltin dicyclohexyl thioglycolate) sulfide
   +Bis-(di-n-butyltin monoglyceryl thioglycolate) sulfide.

The following examples in the opinion of the inventor represent preferred embodiments of the preparation of organotin mercapto acid ester sulfides and mixtures thereof in accordance with the invention.

EXAMPLE A

Preparation of monobutyltin monoisooctyl thioglycolate sulfide

To 70 grams (0.25 mole) of monobutyltin trichloride in 200 ml. of water warmed to 50° C. was added 51 g. (0.25 mole) of isooctyl thioglycolate, after which there was slowly added 10 g. (0.25 mole) of sodium hydroxide dissolved in 15 ml. of water. The mixture was stirred for one hour. The product formed was monobutyltin monoisooctyl thioglycolate dichloride.

There was then added 32.5 g. (0.25 mole) of 60% aqueous sodium sulfide, dissolved in 100 ml. of water. The reaction mixture was extracted with 150 ml. of hexane after stirring for ten minutes, and washed twice with 150 ml. of water. The hexane was then removed under vacuum. A yield of 100 g. of monobutyltin monoisooctyl thioglycolate sulfide was obtained. This corresponds to approximately 97.5% of the theoretical yield. The tin content was 28.2% (calculated: 29%), and the sulfur content 15.9% (calculated: 15.6%).

EXAMPLE B

Preparation of bis-(monobutyltin diisooctyl thioglycolate) sulfide

To 70 g. (0.25 mole) of monobutyltin trichloride dissolved in 100 ml. of water warmed to 50° C. was added 102 g. (0.5 mole) of isooctyl thioglycolate, then there was added 20 g. (0.5 mole) of sodium hydroxide dissolved in 30 ml. of water. The addition of the NaOH was dropwise, keeping the temperature below 50° C. The reaction mixture was stirred for one hour. The product formed was monobutyltin diisooctyl thioglycolate monochloride.

Next, there was added dropwise 16.25 g. (0.125 mole) of 60% aqueous sodium sulfide (dissolved in 50 ml. of water), keeping the reaction mixture at 50° C. The reaction mixture was then stirred for one hour at 50° C., cooled below 40° C., and then 150 ml. of hexane was added. The mixture was stirred for fifteen minutes, and the hexane layer separated, and then washed twice with 150 ml. of water. The aqueous phases were neutral. The hexane was removed under vacuum at 100° C., recovering 150 g. of product, a 100% yield. The product was analyzed and found to contain 20.6% tin (theoretical: 19.9%), and 13.1% sulfur (theoretical: 13.4%).

EXAMPLE C

Preparation of (monobutyltin diisooctyl thioglycolate) (dibutyltin monoisooctyl thioglycolate) sulfide To a solution of 70 g. (0.25 mole) of monobutyltin trichloride in 400 ml. of water at 50° C. in which was suspended 75.5 g. (0.25 mole) of dibutyltin dichloride, was added 152.5 g. (0.75 mole) of isooctyl thioglycolate. Next, 30 g. of sodium hydroxide (0.75 mole) in 45 ml. of water was added slowly, maintaining the temperature at 50° C. Stirring was continued for one hour. The product formed was an equimolar mixture of monobutyltin diisooctyl thioglycolate monochloride and dibutyltin monoisooctyl thioglycolate monochloride.

Then, 32.5 g. (0.25 mole) of 60% Na₂S dissolved in 100 ml. water was added slowly and stirred for one hour. Then the reaction mixture was cooled and extracted with 300 ml. of hexane. The hexane was washed with water, and then stripped under vacuum at about 100° C. The product recovered had a tin content of about 22% (theoretical: 22.5%), and a sulfur content of 12.0% (theoretical: 12.3%).

EXAMPLE D

Preparation of bis-(dibutyltin monoisooctyl thioglycolate) sulfide 98.6 g. of concentrated hydrochloric acid and 50 ml. of water were warmed to about 70° C. There was then added slowly, over a period of one hour, 124.5 g. of dibutyltin oxide (0.5 mole). The mixture was cooled to 55° C., and 102 g. (0.5 mole) of isooctyl thioglycolate added, followed by the dropwise addition of 20 g. of sodium hydroxide (0.5 mole) dissolved in 30 ml. of water. The product formed was dibutyltin monoisooctyl thioglycolate monochloride.

Next, 32.5 g. (0.25 mole) of sodium sulfide (60%) dissolved in 90 ml. of water was added slowly. The mixture was stirred at 60° C. for one-half hour. The product separated from the aqueous solution as a lower layer. The aqueous upper layer was decanted, and fresh water added, and the mixture stirred ten minutes at 50° C. The water washing was repeated once more. The organic lower layer was separated, and dried, under vacuum at 80° C. The yield was 226 g. or 100%. The tin content was 26.2%, and the sulfur content 10.5%.

EXAMPLE E

Preparation of bis-(monobutyltin diisooctyl thioglycolate) sulfide

To 74 g. of concentrated hydrochloric acid in 30 ml. of water was added 52.2 g. (0.25 mole) of monobutyl stannonic acid. The reaction mixture was then heated to 65° C., and held at this temperature for ten minutes. Next, after cooling the reaction mixture to 50° C., there was added 102 g. (0.5 mole) of isooctyl thioglycolate, and 20 g. (0.5 mole) of sodium hydroxide (dissolved in 30 ml. of water). The NaOH addition was dropwise, keeping the temperature at about 50° C. The product was monobutyltin diisooctyl thioglycolate monochloride.

Next, there was added dropwise 16.25 g. (0.125 mole) of sodium sulfide (60% solution in water), and stirring continued until the brown color that resulted upon addition of the sodium sulfide did not lighten further, indicating that the sodium sulfide had fully reacted. At this stage, the pH was about 8, very slightly on the basic side. The reaction mixture was extracted with 150 ml. of hexane at room temperature, and washed with water until the aqueous layer was neutral. The hexane was then stripped off under vacuum at about 100° C. 145 g. of colorless product was recovered (97% of the theoretical). The tin content was 19.5%, and sulfur content 13.5% (calculated: 19.9% Sn, 13.4% S).

EXAMPLE F

Preparation of monobutyltin monoisooctyl thioglycolate sulfide

To 74 g. of concentrated hydrochloric acid in 30 ml. of water was added 52.25 g. (0.25 mole) of butyl stannonic acid. The reaction mixture was then heated to 65° C., and held there for fifteen minutes. After cooling the mixture to 50° C., there was then added 51 g.. (0.25 mole) of isooctyl thioglycolate, and 10 g. NaOH (0.25 mole) in 15 ml. dropwise maintaining the temperature at about 50° C. for one hour. The product was monobutyltin monoisooctyl thioglycolate dichloride.

Next was added 32.5 g. (0.25 mole) of Na$_2$S (60%), dissolved in 100 ml. water. The mixture was stirred one hour. The reaction mixture was extracted with 150 ml. hexane after stirring for fifteen minutes, and washed with 150 ml. water. The hexane was then removed under vacuum. A yield of 100 g. of monobutyltin monoisooctyl thioglycolate sulfide was obtained. This corresponds to approximately 100% of the theoretical yield. The tin content was 29.0% (calculated: 29.0%), and the sulfur content 15.3% (calculated: 15.6%).

EXAMPLE G

Preparation of a mixture of monobutyltin diisooctyl thioglycolate sulfide; bis- (dibutyltin monoisooctyl thioglycolate) sulfide; and (monobutyltin diisooctyl thioglycolate) (dibutyltin monoisooctyl thioglycolate sulfide To 148 g. of concentrated hydrochloric acid in 60 ml. of water warmed to 60° C. there was added 52.25 g. (0.25 mole) of monobutyl stannonic acid, and the mixture heated to 65° C. The oxide dissolved slowly. There was then added 93.4 g. (0.375 mole) of dibutyltin oxide very slowly over a period of one hour, and the dibutyltin dichloride formed remained suspended in the warm (65° C.) aqueous solution as a melt. 153 g. (0.75 mole) isooctyl thioglycolate was added slowly, and then 30 g. of sodium hydroxide dissolved in 45 ml. of water was added dropwise, at a rate to maintain the temperature at about 50° C. without outside application of heat. The product was an equimolar mixture of monobutyltin diisooctyl thioglycolate monochloride and dibutyltin monoisooctyl thioglycolate monochloride.

Next, there was added 48.3 g. (0.375 mole) of 60% sodium sulfide (dissolved in 150 ml. of water). The addition was dropwise at 50° C. and slight heating was applied to maintain this temperature. After 30 minutes at this temperature, additional sodium sulfide was added slowly, to just neutralize the reaction mixture and make it slightly basic, about pH 8. 300 ml. of hexane was added, and the mixture stirred ten minutes to extract the organic product into the hexane. The mixture was transferred to a separating funnel, and the aqueous layer removed. The hexane layer was then washed with water until neutral, and the hexane finally removed under vacuum at 100° C. The yield was 265 g. of a pale yellow liquid, about 90.5% of the theoretical, having a tin content of 25.0%, and a sulfur content of 12.4%.

EXAMPLE H

The procedure of Example C was repeated, substituting 30.2 g. (0.1 mole) of dibutyltin dichloride, 28.0 g. (0.1 mole) of monobutyltin trichloride, 51.0 g. (0.25 mole) of isooctyl thioglycolate, 10 g. (0.25 mole) NaOH, and 16.25 g. (as a 60% aqueous solution) (0.125 mole) of sodium sulfide. The product contained 23.7% tin, and 12.6% sulfur.

EXAMPLE I

Example C was repeated, substituting 30.2 g. (0.1 mole) of dibutyltin dichloride, 14.0 g. (0.05 mole) of monobutyltin trichloride, 51.0 g. (0.25 mole) of isooctyl thioglycolate, and 10 g. (0.25 mole) NaOH, and 6.5 g. (0.05 mole) of sodium sulfide. The product that was recovered contained 21.0% tin, and 11.4% sulfur.

EXAMPLE J

Example C was repeated, substituting 33.5 g. (0.11 mole) of dibutyltin dichloride, 28.0 g. (0.1 mole) of monobutyltin trichloride, 65 g. (0.32 mole) of isooctyl thioglycolate, 12.8 g. of sodium hydroxide and 13.0 g. (0.1 mole) of sodium sulfide (as a 60% sodium sulfide solution). The yield was 98% of a product containing 22.1% tin and 12% sulfur.

EXAMPLE K

Example C was repeated substituting 48.4 g. (0.16 mole) of dibutyltin dichloride, 28.0 g. (0.1 mole) of monobutyltin trichloride, 69.5 g. (0.34 mole) of isooctyl thioglycolate, and 13.6 g. of sodium hydroxide, together with 18.2 g. (0.14 mole) of sodium sulfide (as a 60% aqueous solution). The product recovered had a tin content of 23.8% and a sulfur content of 12%.

EXAMPLE L

The procedure of Example G was repeated, substituting 45.0 g. of monobutyltin oxide, 41.5 g. of dibutyltin oxide, 138 g. of isooctyl thioglycolate, 27 g. of sodium hydroxide, and 21.7 g. of sodium sulfide (as a 60% aqueous solution). The product recovered had a tin content of 21.9% and a sulfur content of 11.9%.

EXAMPLE M

Example G was repeated, substituting 58.8 g. (0.21 mole) of monobutyltin trichloride, 24.8g. (0.1 mole( of dibutyltin oxide, sufficient hydrochloric acid to form the chloride of dibutyltin oxide, 143 g. (0.7 mole) of isooctyl thioglycolate, 28 g. of sodium hydroxide and 8.5 g. (0.065 mole) as a 60% aqueous solution if sodium sulfide. The product recovered had a tin content of 18.5% and a sulfur content of 11.5%.

EXAMPLE N

To 92 g. (0.33 mole) of monobutyltin trichloride dissolved in 260 ml. of petroleum ether (boiling range 60 to 80° C.) there was added 103.5 g. (0.5 mole) isooctyl thioglycolate, and the resulting mixture was then stirred and heated at 55° C. There was then added 50 parts of triethylamine dropwise, while maintaining the temperature at from 55 to 60° C. After cooling, the product was washed three times with an equal volume of water. The organic solvent layer was separated out, after which the solvent was distilled off under vacuum. The product was filtered, and there was obtained an equimolar mixture of monobutyltin monoisooctyl thioglycolate dichloride, and monobutyltin diisooctyl thioglycolate monochloride.

The organotin mercapto acid ester halides and sulfides of the invention can be used as stabilizers with any polyvinyl chloride resin. The term "polyvinyl chloride" as used herein is inclusive of any polymer formed at least in part of the recurring group

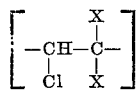

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,984,593 to Isaksem et al., that is, syndiotactic polyvinyl chloride, as well as atactic and isotactic polyvinyl chlorides.

The organotin mercapto acid ester halides and sulfides of this invention, both with and without supplementary stabilizers, are excellent stabilizers for both plasticized and unplasticized polyvinyl chloride resins. When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher fatty acid esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neo pentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occuring oils such as epoxidized soybean oil, epoxidized olive oil, epoxidized cottonseed oil, epoxidized tall oil fatty acid esters, epoxidized linseed oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The organotin mercapto acid ester halide or sulfide stabilizer of the invention is employed in an amount sufficient to impart the desired resistance to heat deterioration at working temperatures of 350° F. and above. The longer the time and themor rigorous the conditions to which the resin will be subjected during working and mixing, the greater will be the amount required. Generally, as little as 0.25% total of the stabilizer by weight of the resin will improve resistance to heat deterioration. There is no critical upper limit on the amount, but amounts above about 10% by weight of the resin do not give an increase in stabilizing effectiveness commensurate with the additional stabilizer employed. Preferably, the amount is from about 0.5 to about 5% by weight of the resin.

The organotin mercapto acid ester sulfide has a sulfur content within the range from about 10 to about 25% and a tin content within the range from about 10 to 35%. For best results, an overall tin content from about 20% to about 30% by weight is preferred.

The stabilizer of the invention is extremely effective when used alone, but it can be employed together with other polyvinyl chloride resin stabilizers, but not other organotin compounds, if special effects are desired. The stabilizer of the invention in this event will be the major stabilizer, and the additional stabilizer will supplement the stabilizing action of the former, the amount of the organotin ester sulfide stabilizer being within the range from about 0.25 to about 10 parts by weight per 100 parts of the resin, and the additional stabilizer being in the amount of from about 0.05 to about 10 parts per 100 parts of the resin.

Among the additional metallic stabilizers are included polyvalent metal salts of medium and of high molecular weight fatty acids and phenols, with metals such as calcium, tin, cadmium, barium, zinc, magnesium, and strontium. The non-metallic stibilizers include phosphites, epoxy compounds, phenolic antioxidants, polyhydric alcohols, and the like. Epoxy compounds are especially useful, and typical compounds are described in U.S. Pat. No. 2,997,454.

The stabilizers of this invention can be formulated for marketing by mixing the organotin mercapto acid ester sulfide with an inert diluent or with any liquid lubricant or plasticizer in suitable concentrations ready to be added to the resin composition to give an appropriate stabilizer and lubricant or plasticizer concentration in the resin. Other stabilizers and stabilizer adjuncts can be incorporated as well.

The preparation of the polyvinyl chloride resin composition is easily accomplished by conventional procedures. The selected stabilizer combination is formed as described above, and then is blended with the polyvinyl chloride resin, or alternatively, the components are blended individually in the resin, using, for instance, a two or three roll mill, at a temperature at which the mix is fluid and thorough blending facilitated, milling the resin composition including any plasticizer at from 250 to 375° F. for a time sufficient to form a homogeneous mass, five minutes, usually. After the mass is uniform, it is sheeted off in the usual way.

For the commercial processing of rigid polyvinyl chloride, the stabilizer is conveniently mixed with all or a portion of the polymer to be stabilized with vigorous agitation under such conditions of time and temperature that the stabilizer is sufficiently imbibed by the polymer to produce a dry, free-flowing powder. The well-known Henschel mixer is well suited to this procedure.

The following examples in the opinion of the inventor represent preferred embodiments of polyvinyl chloride resin compositions incorporating the mono- and diorganotin mercapto carboxylic acid ester sulfides in accordance with the invention as stabilizers therefor.

Scale A:
 0 clear and colorless
 1 trace of color
 2 very light tan
 3 light tan
 4 very light amber
 5 light amber
 6 medium dark yellow
 7 dark amber
 8 green-brown
 9 green-black Scale B:
 clear and colorless
 touch of yellow
 very pale yellow
 pale yellow
 yellow
 yellow-brown edges
 light orange brown
 orange brown
 reddish brown
 brown-black The two color scales are necessitated by the fact that organotin compound-stabilized polyvinyl chloride resin formulations do not degrade according to a single uniform color scheme. Scale A is applicable to the heat degradation of formulations containing monoorganotin compounds and mixtures of monoorganotin and diorganotin compounds, whereas Scale B is applicable to formulations containing diorganotin compounds. The appearance of the samples is reported in Table I below.

TABLE I

| Example | Control A | Control B | Example 1 | Example 2 | Example 3 | Control C | Control D |
|---|---|---|---|---|---|---|---|
| Stabilizer | A | B | Example C | Example D 1.02 | Example D 1.05 | C | D |
| Amount | 2.15 | 2.65 | 1.75 | Example E 0.68 | Example F 0.45 | 0.9 | 0.75 |
| 0 | B-0 | A-0 | A-0 | A-0 | A-0 | B-0 | A-0 |
| 15 | B-4 | A-1 | A-0 | A-1 | A-1 | B-5 | A-3 |
| 30 | B-4 | A-3 | A-1 | A-1 | A-1 | B-5 | A-4 |
| 45 | B-4 | A-4 | A-1 | A-2 | A-2 | B-5 | A-6 |
| 60 | B-5 | A-4 | A-2 | A-3 | A-3 | B-6 | A-8 |
| 75 | B-7 | A-4 | A-3 | A-3 | A-4 | B-7 | A-9 |
| 90 | B-8 | A-6 | A-4 | A-5 | A-4 | B-8 | |
| 105 | B-9 | A-7 | A-6 | A-7 | A-7 | B-9 | |
| 120 | B-9 | A-8 | A-8 | A-8 | A-8 | B-9 | |

Examples 1 to 3

A series of rigid or nonplasticized formulations was prepared having the following composition.

Ingredients   Parts by weight
  Polyvinyl chloride homopolymer (Diamond 40)   100
  Acrylonitrile-butadiene-styrene copolymer (Blendex 40)   12
  Stabilizer—To provide 0.40 g. Sn weight as shown in Table I.

The stabilizer concentrations used in each sample of resin tested contained the same total amount of tin, i.e. 0.40 part of tin per 100 parts of resin.

The stabilizer was mixed in the resin in the proportion indicated in Table I below on a two roll mill to form a homogeneous sheet, and sheeted off. Strips were cut off from the sheet and heated in an oven at 375° F. for two hours to determine heat stability. Pieces of each strip were removed at 15 minute intervals and affixed to cards to show the progressive heat deterioration.

Compounds A–D were used as controls representing the closest prior art stabilizers.

A=Dibutyltin bis(isooctylthioglycolate)
B=Monobutyltin tris(isooctylthioglycolate)
C=Dibutyltin sulfide
D=Butyltin sesquisulfide The heat degradation is evaluated by the amount of color formed, i.e., the extent of discoloration relative to the controls. Two scales were used to characterize the amount of color formation. Scale A covers the color range from colorless through tan and amber to greenish brown. Scale B covers the color range from colorless through yellow and orange to reddish brown. Each scale ranges numerically from 0 (colorless) to 9 (brown).

The results clearly indicate the improved effectiveness of the organotin mercaptoacid ester sulfides of this invention in a rigid polyvinyl chloride resin formulation. This is of particular significance because rigid polyvinyl chloride is known to require the most powerful stabilizers for effective processing and long term aging.

In Table I, Examples 1, 2 and 3 containing the preferred stabilizer composition, i.e., a combination of mono- and dibutyltin mercapto acid ester sulfides, are markedly superior to controls A, B, C and D.

Example 1 maintains better color after 60 minutes of heating at 375° F. than do controls A, C and D after only 15 minutes of heating and control B after 30 minutes of heating. This means for all practical purposes that Example 1 has about four times the stabilizing effectiveness of controls A, C and D, and about two to three times the effectiveness of control B.

Similarly, Examples 2 and 3 have twice the effectiveness of control B (the best control sample). The degree of discoloration reached by the control B after only 30 minutes of heating is not reached by Examples 2 and 3 until 60 minutes of heating.

The particular advantage of the stabilizers of the invention can better be appreciated if one considers the fact that the expensive and primary stabilizing ingredient in the controls A through D and Examples 1 through 3 (i.e. the tin) is present in equal amounts, 0.40 g. tin phr., whereas the total stabilizer level of Examples 1, 2 and 3 is only 66%, 64% and 57% of control B, respectively.

Examples 4 to 6

Another series of resin formulations was prepared having the following composition:

Ingredients   Parts by weight
  Polyvinyl chloride homopolymer (Diamond 40)   100
  Stabilizer   1.5

The same procedure was followed in preparing and testing the compositions as in Examples 1 to 3, substituting equal weights of stabilizers, instead of weights to give equal amounts of tin. The appearance of the samples is reported in Table II below.

TABLE II

| Example | Control E | Control F | Example 4 | Example 5 | Example 6 | Control G |
|---|---|---|---|---|---|---|
| Stabilizer | B | A | Example H | Example I | Example L | C |
| Amount | 1.5 | 1.5 | 1.5 | 1.5 | 1.5 | 1.5 |
| 0 | A-0 | B-0 | A-0 | A-0 | A-0 | A-0 |
| 15 | A-0 | B-3 | A-0 | A-0 | A-0 | A-4 |
| 30 | A-1 | B-4 | A-0 | A-0-1 | A-0 | A-4 |
| 45 | A-2 | B-5 | A-1 | A-1 | A-0-1 | A-5 |
| 60 | A-8 | B-6 | A-2 | A-2 | A-2 | A-5 |
| 75 | A-9 | B-8 | A-5 | A-4 | A-8 | A-6 |
| 90 | | B-8-9 | A-8 | A-8 | A-9 | A-7 |
| 105 | | B-8-9 | A-9 | A-9 | A-9 | A-8 |
| 120 | | B-8-9 | A-9 | A-9 | A-9 | A-9 |

The results of Table II clearly indicate the improved effectiveness obtained by using mixtures of mono- and dibutyltin isooctyl thioglycolate sulfides even at the low total proportion by weight of 1.5 parts per 100 parts resin. The samples containing the stabilizer of the present invention, Examples 4, 5 and 6, inhibited the deterioration of the resin upon heating at 375° F. for a period of time substantially longer than either monobutyltin tris(isooctyl thioglycolate), dibutyltin bis(isooctyl thioglycolate) or dibutyltin sulfide. Examples 4, 5 and 6 maintained better color appearance during the first 30 minutes of heating. In addition, the resin compositions of Examples 4, 5 and 6 containing the novel stabilizers underwent only light discoloration even after 60 minutes of heating, whereas Control E, monobutyltin tris(isooctyl thioglycolate), acquired a significant discoloration after 30 minutes of heating, and turned dark green after 60 minutes of heating. Controls F and G were quite yellow after only 15 minutes of heating and became progressively darker on further heating.

Examples 7 and 8

A rigid nonplasticized formulation was prepared, having the following composition:

Ingredients                                     Parts by weight
Polyvinyl chloride homopolymer (Diamond 40) _____ 100
Stabilizer—To provide 0.41 g. tin weight of stabilizer as shown in Table III.

The same procedure was followed in preparing and testing the resins as in Examples 1 to 3, and the appearance of the test samples is set out in Table III.

TABLE III

| Example | Control H | Control I | Example 7 | Example 8 | Control J | Control K |
|---|---|---|---|---|---|---|
| Stabilizer | B | A | Example H | Example J | C | D |
| Amount | 2.7 | 2.2 | 2.2 | 1.85 | 1.0 | 0.8 |
| 0 | A-0 | B-0 | A-0 | A-0 | A-0 | A-0 |
| 15 | A-0 | B-2 | A-0 | A-0 | A-3 | A-2 |
| 30 | A-1 | B-3 | A-0-1 | A-0 | A-3 | A-6 |
| 45 | A-2 | B-4 | A-1 | A-1 | A-3-4 | A-7 |
| 60 | A-5 | B-5 | A-3 | A-2 | A-4 | A-9 |
| 75 | A-8 | B-6 | A-5 | A-4 | B-6 | A-9 |
| 90 | A-9 | B-8 | A-8 | A-7-8 | B-9 | |
| 105 | | B-9 | A-9 | A-9 | | |
| 120 | | | | A-9 | | |

The results clearly indicate the improved effectiveness obtainable by the mixed mono- and dibutyltin isooctyl thioglycolate sulfide. The stabilizer combinations of this invention, 2.2 and 1.85 parts per 100 parts resin, as exemplified by Examples 7 and 8, respectively, provided a clear composition after 30 minutes of heating at 375° F. that was no more discolored than Control H, containing monobutyltin tris(isooctyl thioglycolate) in a higher total amount of stabilizer, i.e. 2.7 parts by weight per 100 parts resin, after only 15 minutes of heating. The degree of discoloration shown by Control H after 30 minutes was not reached by the sample of Example 7 until after 45 minutes, and by the sample of Example 8 until after 60 minutes of heating. Thus, the stabilizer compositions of this invention considerably extend the processing period before unacceptable discoloration appears. Controls I, J and K showed undesirable initial color and early discoloration, i.e. the development of a yellow or tan discoloration within only 15 minutes after heating had begun.

Examples 9 and 10

Another series of resin formulations was prepared having the following composition:

Ingredients                                     Parts by weight
Polyvinyl chloride homopolymer (Diamond 40) _____ 100
Isooctyl epoxy stearate _____ 3
Stabilizer _____ 2.2

The same procedure was followed in preparing and testing the compositions as in Examples 1 to 3, and the appearance of the samples is reported in Table IV below.

TABLE IV

| Examples | Control L | Example 9 | Example 10 | Control M |
|---|---|---|---|---|
| Stabilizer | B | Example J | Example K | C |
| Amount | 2.2 | 2.2 | 2.2 | 2.2 |
| 0 | A-0 | A-0 | A-0 | A-0 |
| 15 | A-1 | A-0 | A-0 | A-3 |
| 30 | A-2 | A-0-1 | A-0 | A-3 |
| 45 | A-3 | A-1 | A-0-1 | A-3 |
| 60 | A-6 | A-2 | A-1 | A-4 |
| 75 | A-9 | A-2-3 | A-2 | A-5 |
| 90 | A-9 | A-4 | A-3 | A-6 |
| 105 | | A-7 | A-6-7 | A-7 |
| 120 | | A-9 | A-8 | A-7-8 |

The results clearly indicate that when used at equal total concentration by weight, the mixed mono- and dibutyltin isooctyl thioglycolate sulfides inhibit the deterioration of the resin upon heating at 375° F. for a period of time substantially longer than either monobutyltin tris(isooctyl thioglycolate) or dibutyltin sulfide, and thus increase processing time before a harmful discoloration appears. Control L acquired a very light discoloration within 15 minutes of heating, but Example 9 did not reach this discoloration until after 45 minutes of heating, and Example 10 only after 60 minutes of heating. This is equal to three and four times the stability of Control L. In addition, Examples 9 and 10 underwent slight discoloration after 75 and 90 minutes of heating at 375° F., whereas Control L, the composition containing the monobutyltin tris(isooctyl thioglycolate), acquired a dark discoloration after 60 minutes, and was black after 75 minutes of heating. Control M, although it did not turn black until after two hours of heating, immediately, i.e. after 15 minutes of heating, acquired a yellow discoloration, which became progressively darker on further heating.

Example 11

Resin compositions were prepared having the same formulation as Examples 1 to 3, substituting the stabilizer of Example D, and the same test procedure was followed. The results are outlined in Table V. All formulations contained equal amounts of tin, 0.40 g. phr.

TABLE V

| Example | Control A | Example 11 | Control B |
|---|---|---|---|
| Stabilizer | A | Example D | C |
| Amount | 2.15 | 1.53 | 0.9 |
| 0 | B-0 | B-0 | B-0 |
| 15 | B-4 | B-2-4 | B-5 |
| 30 | B-4 | B-2-4 | B-5 |
| 45 | B-4 | B-3-4 | B-5 |
| 60 | B-5 | B-5 | B-6 |
| 75 | B-7 | B-6 | B-7 |
| 90 | B-8 | B-8 | B-8 |
| 105 | B-9 | B-9 | B-9 |
| 120 | B-9 | B-9 | B-9 |

The results demonstrate that the dibutyltin mercapto acid sulfide is a better and more efficient stabilizer than either dibutyltin mercapto acid ester or dibutyltin sulfide.

Example 11 is at least as efficient as dibutyltin-bis-(isooctyl thioglycolate), Control A, at equal tin levels, though present at only 72% of total stabilizer level, and it is much better than dibutyltin sulfide, Control B, at equal tin levels. Control B already gives severe discoloration at 0.9 phr., and would give even more discoloration if used in larger amounts (compare Controls G and J, Tables II and III).

Examples 12 and 13

Resin compositions were prepared having the same formulation as Examples 1 to 3, substituting the stabilizers of Examples E and F. All formulations contained 0.40 g. tin phr.

The same test procedure was followed and the results are tabulated in Table VI.

TABLE VI

| Example | Control B | Example 12 | Example 13 | Control D |
|---|---|---|---|---|
| Stabilizer | B | Example E | Example F | D |
| Amount | 2.65 | 2.02 | 1.35 | 0.75 |
| 0 | A-0 | A-0 | A-0 | A-0 |
| 15 | A-1 | A-1 | A-1 | A-3 |
| 30 | A-3 | A-2 | A-2 | A-4 |
| 45 | A-4 | A-3 | A-3 | A-6 |
| 60 | A-4 | A-4 | A-5 | A-8 |
| 75 | A-4 | A-4 | A-6 | A-9 |
| 90 | A-6 | A-6 | A-8 | |
| 105 | A-7 | A-8 | A-9 | |
| 120 | A-8 | A-9 | A-9 | |

Examples 12 and 13 demonstrate the advantage of the monobutyltin mercapto acid ester sulfides over either the monobutyltin mercapto acid esters or the monobutyltin sulfides alone.

Examples 12 and 13 have better color stability after 30 minutes of heating than the monobutyltin tris(isooctyl thioglycolate), Control B, and monobutyltin sesquisulfide, Control D at equal tin content, and this is only 76.5% and 57% of total stabilizer level of Control B. Control D already had severe discoloration after 15 minutes, at equal tin content, and would only provide greater discoloration at higher concentrations.

Examples 14 to 16

Another series of resin formulations was prepared having the following composition:

| Ingredients | Parts by weight Example 14 | Example 15 | Example 16 |
|---|---|---|---|
| Polyvinyl chloride homopolymer, Diamond 40 | 100 | 100 | 100 |
| Isooctyl epoxy stearate | 3 | 3 | 3 |
| Stabilizer of Example N | 1.5 | 2.2 | 3.5 |

The same procedure was followed in preparing and testing the compositions as in Examples 1 to 3.

The results clearly indicated the effectiveness obtained by using the mixed monobutyltin mono- and diisooctyl thioglycolate di- and monochlorides, even at the low total proportion by weight of 1.5 parts per 100 parts resin. The samples containing the stabilizer of Example N had good initial color upon heating at 375° F. Examples 14, 15 and 16 maintained excellent color appearance during the first 30 minutes of heating.

The stabilizer compositions of this invention are advantageously used in resins formed into many useful structural members including extruded polyvinyl chloride pipe useful for water, brine, crude petroleum, gasoline, natural and manufactured fuel gas, and domestic and industrial wastes; flat and corrugated profiles for the construction industry, and blow-molded bottles. Typical formulations are as follows:

Pipe
    Composition             Parts by weight
       Medium mol. wt. polyvinyl chloride
          homopolymer (K=55) _____ 100
       ABS polymer _____ 10
       Calcium stearate _____ 1
       Product of Example I_____ 1.4
       Pigment _____ As desired Parisons for blow-molding bottles
    Composition             Parts by weight
       Medium mol. wt. polyvinyl chloride homopolymer (K=55) __ 100
       Styrene-butadiene-methyl methacrylate polymer _____ 10
       Stearic acid _____ 0.5
       Product of Example L _____ 1.6
       Blue dye _____ 0.0005–0.002

Food-grade bottles
    Composition             Parts by weight
       Medium mol. wt. polyvinyl chloride homopolymer (K=55) _____ 100
       ABS polymer _____ 10
       n-Octyltin isooctyl thioglycolate sulfide __ 0.9
       Bis(di-n-octyltin monoisooctyl thioglycolate) sulfide _____ 0.95
       di-n-Octyltin oxide _____ 0.05

Profiles
    Composition             Parts by weight
       High mol. wt. polyvinyl chloride homopolymer (K=70) _____ 100
       Chlorinated polyethylene (31% Cl) _____ 15
       Isooctyl epoxystearate _____ 2
       di-n-Octyltin bis(monoisooctyl thioglycolate) sulfide _____ 1.0
       n-Butyltin isooctyl thioglycolate sulfide __ 0.55
       Magnesium stearate _____ 0.25

These formulations each contain sufficient stabilizer in accordance with the invention to be processed at elevated temperatures into the desired shapes without deleterious discoloration or embrittlement.

Having regard to the foregoing disclosure, the following is claimed as the inventive and patentable embodiments thereof:

1. A process for preparing an organotin mercapto carboxylic acid ester sulfide having at least one tin atom to which organic groups are linked only through carbon and sulfur, and having linked to at least one tin atom per molecule at least one hydrocarbon group selected from the group consisting of alkyl, aryl, cycloalkyl, alkylcycloalkyl, cycloalkylalkyl and arylalkyl groups having from one to about eighteen carbon atoms and linked to tin through carbon, at least one α- or β-mercapto carboxylic acid ester group linked to tin through sulfur of a mercapto group, and at least one sulfide sulfur group, the organotin ester having an amount of tin within the range from about 18 to about 35% by weight, and an amount of sulfur within the range from about 10 to about 25% by weight, which comprises reacting an organotin di- or trihalide in the presence of water with a mercapto acid ester and an alkali or alkaline earth metal base in less than stoichiometric quantities to form an organotin mercaptocarboxylic acid ester halide, and then reacting the organotin mercapto carboxylic acid ester halide product to a pH not exceeding 10 with an alkali or alkaline earth metal sulfide, and then separating the organotin mercapto carboxylic acid ester sulfide from the aqueous portion.

2. A process in accordance with claim 1, which comprises starting with the corresponding organotin oxide or stannonic acid, reacting the same with dilute aqueous halogen acid at a temperature from 25 to 200° C. to form the organotin halide.

3. A process in accordance with claim 1 in which the organotin mercapto carboxylic acid ester sulfide has the formula:

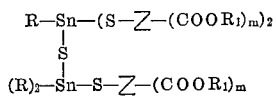

wherein $m$ is the number of $COOR_1$ groups, and is an integer from one to four, R is a hydrocarbon group selected from the group consisting of alkyl, aryl, cycloalkyl, alkylcycloalkyl, cycloalkyl and arylalkyl groups having from about one to about eighteen carbon atoms, $R_1$ is an organic group derived from a monohydric or polyhydric alcohol having from one to about four hydroxyl groups and from one to about eighteen carbon atoms, and $Z$ is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups.

4. A process in accordance with claim 1 in which the organotin mercapto carboxylic acid ester sulfide has the formula:

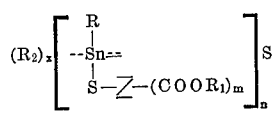

wherein m is the number of $COOR_1$ groups, and is an one, $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, $R_2$ is R or S—Z—$(COOR_1)_m$ and $Z$ is a bivalent alkylene radical carrying the S group in in a position alpha or beta to a $COOR_1$ group, having from one to about five carbon atoms, and optionally containing additional groups selected from free carboxylic acid groups, carboxylic acid ester groups, carboxylic acid salt groups, and mercapto groups.

5. A process in accordance with claim 1 in which the organotin mercapto carboxylic acid ester sulfide has the formula:

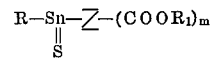

wherein $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, and $R_2$ is R or S—Z—$(COOR_1)_m$, and $Z$ is a bivalent alkylene radical carrying the S group from one to about five carbon atoms, and optionally containing additional groups selected from free carboxylic acid groups, carboxylic acid ester groups, carboxylic acid salt groups, and mercapto groups.

6. A process in accordance with claim 1 in which the organotin mercapto carboxylic acid ester sulfide has the formula:

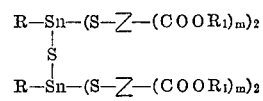

where $m$ is the number of $COOR_1$ groups, and is an integer from one to four,

R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, and $Z$ is a bivalent alkylene radical carrying the S group in a position alpha or beta to a $COOR_1$ group, having from one to about five carbon atoms, and optionally containing additional groups selected from free carboxylic acid groups, carboxylic acid salt groups, carboxylic acid ester groups, and mercapto groups.

7. A process in accordance with claim 1 in which the organotin mercapto carboxylic acid ester sulfide has the formula:

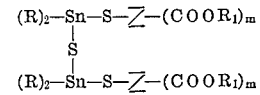

wherein $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, and $Z$ is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups.

8. A process in accordance wtih claim 1 in which the organotin mercapto carboxylic acid ester sulfide has the formula:

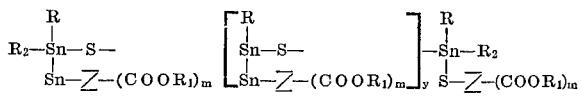

wherein $y$ is a number from 1 to 5, $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, $R_2$ is R or $S-Z-(COOR_1)_m$, and Z is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups.

9. A process in accordance with claim 1 wherein the hydrocarbon group is alkyl, and the mercapto carboxylic acid ester group is an alkyl ester of a mercapto carboxylic acid having from two to five carbon atoms, the alkyl having from one to about eighteen carbon atoms.

10. An organotin mercapto carboxylic acid ester halide having the formula:

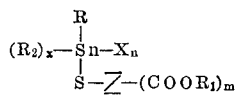

wherein $n$ is an integer from one to two, $x$ is zero or one, $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, $R_2$ is R or $S-Z-(COOR_1)_m$, X is halogen, and Z is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups.

11. An organotin mercapto carboxylic acid ester halide in accordance with claim 10 wherein the hydrocarbon group is alkyl, and the mercapto carboxylic acid ester group is an alkyl ester of a mercapto carboxylic acid having from two to five carbon atoms, the alkyl having from one to about eighteen carbon atoms.

12. A process in accordance with claim 1 in which a mixture of organotin stabilizers is prepared comprising at least one organotin mercapto carboxylic acid ester sulfide having the formula:

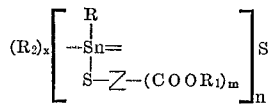

wherein $n$ is an integer from one to two, $x$ is one, $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, $R_2$ is R or $S-Z-(COOR_1)_m$, and Z is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups, and at least one organotin mercaptocarboxylic acid ester sulfide having the formula:

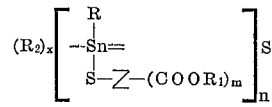

wherein $n$ is an integer from one to two, $x$ is zero, $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, $R_2$ is R or $S-Z-(COOR_1)_m$, and Z is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups.

13. A process in accordance with claim 1 in which a mixture of organotin stabilizers is prepared comprising at least one organotin mercaptocarboxylic acid ester sulfide having the formula:

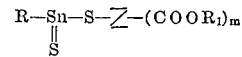

wherein $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, and Z is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups, and at least one organotin mercapto carboxylic acid ester sulfide having the formula:

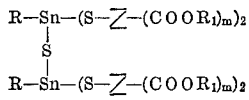

wherein $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, and Z is a bivalent alkylene radical carrying the S group in a position alpha or beta to a $COOR_1$ group, having from one to about five carbon atoms, and optionally containing additional groups selected from free carboxylic acid groups, carboxylic acid salt groups, carboxylic acid ester groups, and mercapto groups.

14. A process in accordance with claim 1 in which a mixture of organotin stabilizers is prepared, comprising at least one organotin mercapto carboxylic acid ester sulfide having the formula:

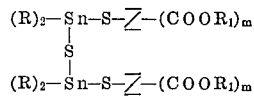

wherein $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, and Z is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups, and at least one organotin mercapto carboxylic acid ester sulfide having the formula:

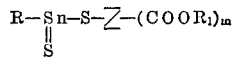

wherein $m$ is the number of $COOR_1$ groups, and is an integer from one to four, R is a hydrocarbon group selected from the group consisting of alkyl, aryl, cycloalkyl, alkylcycloalkyl, cycloalkylalkyl and arylalkyl groups having from about one to about eighteen carbon atoms, $R_1$ is an organic group derived from a monohydric or polyhydric alcohol having from one to about four hydroxyl groups and from one to about eighteen carbon atoms, and Z is a bivalent alkylene radical carrying the S group in a position alpha or beta to a $COOR_1$ group, having from one to about five carbon atoms, and optionally containing additional groups selected from free carboxylic acid groups, carboxylic acid ester groups, carboxylic acid salt groups, and mercapto groups.

15. A mixture of organotin mercapto carboxylic acid ester halides in accordance with claim 10, in which, in at least one of the organotin mercapto carboxylic acid ester halides, $x$ has the value of 0, and in at least one organotin mercapto carboxylic acid ester halide, $x$ has the value of 1.

16. A process in accordance with claim 1 in which the organic group linked to tin through carbon is n-butyl.

17. A process in accordance with claim 1 in which the organic group linked to tin through carbon is n-octyl.

18. A process in accordance with claim 9, in which the hydrocarbon group is butyl and the mercapto carboxylic acid ester group is a thioglycolate ester.

19. An organotin mercapto carboxylic acid ester halide in accordance with claim 10 in which the organic group linked to tin through carbon is n-butyl.

20. An organotin mercapto carboxylic acid ester halide in accordance with claim 10 in which the organic group linked to tin through carbon is n-octyl.

21. An organotin mercapto carboxylic acid ester halide in accordance with claim 10, in which the hydrocarbon group is butyl and the mercapto carboxylic acid ester group is a thioglycolate ester.

References Cited
UNITED STATES PATENTS

| | | | |
|---|---|---|---|
| 2,648,650 | 8/1953 | Weinberg et al. | 260—429.7X |
| 3,293,273 | 12/1966 | Gloskey | 260—429.7 |
| 3,396,185 | 8/1968 | Hechenbleikner | 260—429.7 |
| 3,412,120 | 11/1968 | Considine et al. | 260—429.7 |

JAMES E. POER, Primary Examiner

W. F. W. BELLAMY, Assistant Examiner

U.S. Cl. X.R.

260—45.75

PO-1050
(5/69)

UNITED STATES PATENT OFFICE
CERTIFICATE OF CORRECTION

Patent No. 3,565,931                Dated Feb. 23, 1971

Inventor(s) Lawrence Robert Brecker

It is certified that error appears in the above-identified patent and that said Letters Patent are hereby corrected as shown below:

Col. 3, line 73, "cycloalkyl" - third occurrence, should be --cycloalkylalkyl--.  Col. 4, line 4, "palymityl" should be --palmit Col. 5, line 1, "sudfides" should be --sulfides--; line 15, formula E should read:

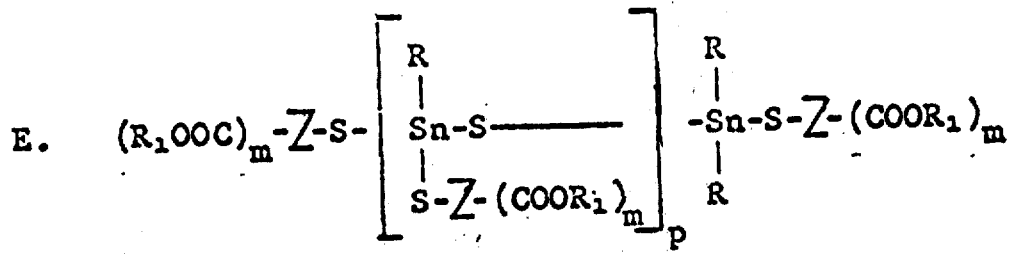

Col. 5, line 26, "member" should be --number--; line 70, that port of "II" reading

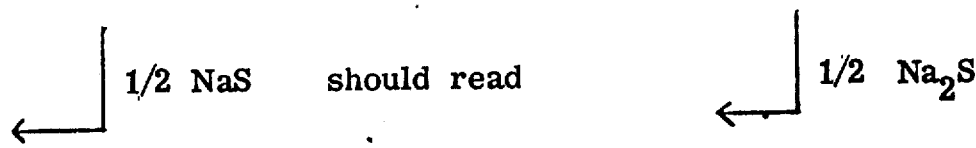

Col. 6, line 1, delete "now".  Col. 7, line 50, that part of the formula reading

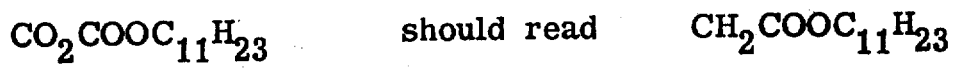

Col. 8, line 20, Formula 12, that part reading

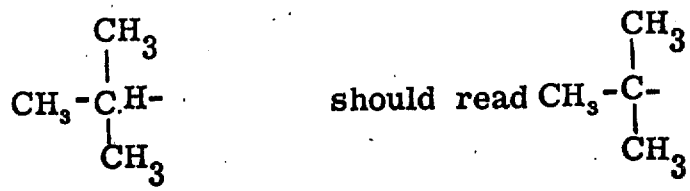

Col. 8, line 35, that part of Formula 15 reading $\underset{|}{CH_2}CO + H$  should read  $\underset{|}{CH_2}COOH$ Col. 8, end of the top line of Formula 18 reading $SCH_2COOC_9H_{17}$  should read  $SCH_2COOC_8H_{17}$ Col. 9, line 51, "ethylhexanoloxethyl" should read --ethylhexanoyloxyethyl--. Col. 11, line 62, after "sulfide" insert -- ) --. Col. 12, line 64, "(" after mole, should be -- )--; line 68, "if" should be --of--. Col. 13, line 69, "neo pentyl" should be --neopentyl--. Col. 14, line 27 "th;mor" should be --the more--; line 59, "stibilizers" should be --stabilizers--. Col. 17, Table III, last column of table, "A-7" should be --A-8--. Col. 18, line 70, period (.) following "heating" should be a comma --(,)--. Col. 21, line 41, "cycloalkyl" should be --cycloalkylalkyl--; line 46, first symbol in line " $\angle$ " should be -- $Z$ --. Col. 21, line 61, after "wherein" insert --n is an integer from one to two, X is zero or one, --; delete all of line 62. Col. 22, the formula after line 6 should read:

$R\text{-}\underset{\underset{S}{\|}}{Sn}\text{-}S\text{-}Z\text{-}(COOR_1)_m$  ; formula at line 20, following "carbon atoms, and" should be completely omitted; at end of line 22, following "S group" insert --in a position alpha or beta to a $COOR_1$ group, having --; line 36, "where" preceding "m" should be --wherein--.

Col. 23, line 3 "wtih" should be --with--; Claim 8, that part of the formula reading

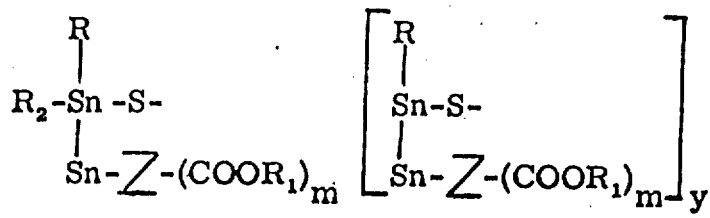

should read

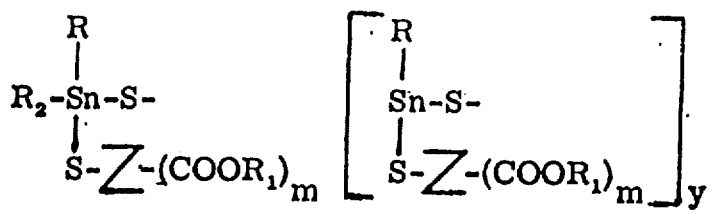

Claim 12, that part of the two formulae in column 23 line 70 and column 24, line 25 reading

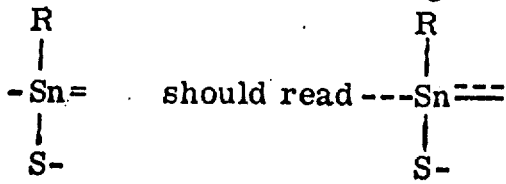

Signed and sealed this 30th day of November 1971.

(SEAL)
Attest:

EDWARD M. FLETCHER, JR.
Attesting Officer

ROBERT GOTTSCHALK
Acting Commissioner of Patents

Disclaimer 3,565,931.—*Lawrence Robert Brecker*, Brooklyn, N.Y. PROCESS FOR PREPARING ORGANOTIN MERCAPTO CARBOXYLIC ACID ESTER SULFIDES CONTAINING MORE THAN 18% TIN. Patent dated Feb. 23, 1971. Disclaimer filed June 19, 1972, by the assignee, *Argus Chemical Corporation*.

Hereby enters this disclaimer to claims 10, 11, 15, 19, 20 and 21 of said patent.

[*Official Gazette September 12, 1972*]